United States Patent
Pan et al.

(10) Patent No.: US 11,584,361 B2
(45) Date of Patent: *Feb. 21, 2023

(54) SYSTEMS AND METHODS TO IMPROVE RIDE COMFORT FOR USERS WITHIN A VEHICLE DURING OPERATION OF THE VEHICLE

(71) Applicant: TOYOTA RESEARCH INSTITUTE, INC., Los Altos, CA (US)

(72) Inventors: Selina Pan, San Francisco, CA (US); Carrie Bobier-Tiu, Sunnyvale, CA (US); Avinash Balachandran, Sunnyvale, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/034,632

(22) Filed: Sep. 28, 2020

(65) Prior Publication Data
US 2021/0009109 A1    Jan. 14, 2021

Related U.S. Application Data

(63) Continuation of application No. 16/223,501, filed on Dec. 18, 2018, now Pat. No. 10,821,969.

(51) Int. Cl.
*B60W 40/08* (2012.01)
*B60W 30/02* (2012.01)
(Continued)

(52) U.S. Cl.
CPC .......... *B60W 30/025* (2013.01); *B60W 40/08* (2013.01); *B60R 16/037* (2013.01);
(Continued)

(58) Field of Classification Search
CPC ............. B60W 50/0098; B60W 30/02; B60W 30/025; B60W 2050/0063;
(Continued)

(56) References Cited

U.S. PATENT DOCUMENTS 7,437,219 B2 * 10/2008 Bos ...................... B60R 16/0232
701/1
8,855,867 B2 * 10/2014 Gunther .................. B60R 16/02
701/1

(Continued)

FOREIGN PATENT DOCUMENTS

CN      104773170 B  *  3/2017  .......... B60W 40/112
DE     102018102533 A1 *  8/2018 ............... B60K 6/54

OTHER PUBLICATIONS

Rohit Pandita et al., Preceding Vehicle State Prediction, 2013 IEEE Intelligent Vehicles Symposium (IV) Jun. 23-26, 2013, Gold Coast, Australia (Year: 2013).*

(Continued)

*Primary Examiner* — Cuong H Nguyen
(74) *Attorney, Agent, or Firm* — Sheppard, Mullin, Richter & Hampton LLP; Hector A. Agdeppa; Daniel N. Yannuzzi

(57) ABSTRACT

Systems and methods to improve ride comfort for users within a vehicle during operation of the vehicle are disclosed. Exemplary implementations may: generate output signals; determine the current operational information regarding the vehicle; determine a current set of forces operating on one or more of the vehicle and one or more of the users within the vehicle; compare a characteristic of the current set of forces to a comfort threshold level; and responsive to the characteristic breaching the comfort threshold level, effectuate a modification in the operation of the vehicle such that a subsequent change in the characteristic that corresponds to the modification reduces and/or remedies the breach of the comfort threshold level.

16 Claims, 3 Drawing Sheets

(51) Int. Cl.
*B60R 16/037* (2006.01)
*B60W 40/112* (2012.01)

(52) U.S. Cl.
CPC .......... *B60W 30/02* (2013.01); *B60W 40/112* (2013.01); *B60W 2520/125* (2013.01); *B60W 2520/14* (2013.01)

(58) Field of Classification Search
CPC ......... B60W 2720/00; B60W 2552/35; B60W 60/0013; B60W 2050/14; B60W 2520/125; B60W 40/08; B60W 40/0112; B60R 16/037; G05D 1/0214
USPC .......................................................... 701/36
See application file for complete search history.

(56) References Cited

U.S. PATENT DOCUMENTS

| | | | | |
|---|---|---|---|---|
| 9,145,129 | B2* | 9/2015 | Worrel | B60R 16/037 |
| 10,821,969 | B2* | 11/2020 | Pan | B60W 30/025 |
| 2011/0035100 | A1* | 2/2011 | Sanma | B62D 15/029 |
| | | | | 701/36 |
| 2011/0172880 | A1* | 7/2011 | Tamura | B60H 1/00771 |
| | | | | 701/36 |
| 2012/0303221 | A1* | 11/2012 | Gunthner | B60R 16/02 |
| | | | | 702/182 |
| 2015/0120149 | A1* | 4/2015 | Worrel | B60H 1/00742 |
| | | | | 701/49 |
| 2019/0344783 | A1* | 11/2019 | Bertollini | B60W 60/0013 |

OTHER PUBLICATIONS

Intrasen Raghupatruni et al., Empirical Testing of Automotive Cyber-Physical Systems with Credible Software-in-the-Loop Environments; © 2019 IEEE (Year: 2019).*

Kai Liu et al., Dynamic Modeling and Control of High-Speed Automated Vehicles for Lane Change Maneuver; IEEE Transactions on Intelligent Vehicles, vol. 3, No. 3, Sep. 2018 (Year: 2018).*

Stephen M Erlien et al., Incorporating Non-Linear Tire Dynamics into a Convex Approach to Shared Steering Control: 2014 American Control Conference (ACC); Jun. 4-6, 2014. Portland, Oregon, USA (Year: 2014).*

* cited by examiner

SYSTEMS AND METHODS TO IMPROVE RIDE COMFORT FOR USERS WITHIN A VEHICLE DURING OPERATION OF THE VEHICLE

CROSS REFERENCE TO RELATED APPLICATIONS

This application is a continuation of U.S. patent application Ser. No. 16/223,501, filed Dec. 18, 2018, entitled "SYSTEMS AND METHODS TO IMPROVE RIDE COMFORT FOR USERS WITHIN A VEHICLE DURING OPERATION OF THE VEHICLE," the entire contents of which is incorporated herein by reference.

TECHNICAL FIELD

The disclosed technology relates generally to systems and methods for improving ride comfort for users within a vehicle during operation of the vehicle.

DESCRIPTION OF RELATED ART

Vehicles may operate in one or more of a manual driving mode, a guided driving mode, and an autonomous driving mode. In some modes of operation, control of a vehicle may be modified if the expected or actual consequences include undesirable effects.

Brief Summary of Embodiments

One aspect of the present disclosure relates to a system and/or vehicle configured to improve ride comfort for users within a vehicle during operation of the vehicle. The vehicle may include one or more hardware processors configured by machine-readable instructions. The vehicle may be configured to generate output signals. The output signals may convey current operational information regarding the vehicle. The processor(s) may be configured to determine the current operational information regarding the vehicle. The determination may be based on the output signals. The current operational information may include speed of the vehicle. The processor(s) may be configured to determine a current set of forces operating on one or more of the vehicle and one or more users within the vehicle. An individual force in the current set of forces may be based on one or more of a lateral acceleration, a yaw rate, and/or other parameters. The processor(s) may be configured to compare a characteristic of the current set of forces to a comfort threshold level. A breach of the comfort threshold level may indicate an undesirable level of comfort for one or more of the users within the vehicle. The processor(s) may be configured to effectuate, responsive to the characteristic breaching the comfort threshold level, a modification in the operation of the vehicle such that a subsequent change in the characteristic that corresponds to the modification reduces and/or remedies the breach of the comfort threshold level.

Another aspect of the present disclosure relates to a method to improve ride comfort for users within a vehicle during operation of the vehicle. The method may include generating output signals. The output signals may convey current operational information regarding the vehicle. The method may include determining the current operational information regarding the vehicle. The determination may be based on the output signals. The current operational information may include speed of the vehicle. The method may include determining a current set of forces operating on one or more of the vehicle and one or more users within the vehicle. An individual force in the current set of forces may be based on one or more of a lateral acceleration, a yaw rate, and/or other parameters. The method may include comparing a characteristic of the current set of forces to a comfort threshold level. A breach of the comfort threshold level may indicate an undesirable level of comfort for one or more of the users within the vehicle. The method may include effectuating, responsive to the characteristic breaching the comfort threshold level, a modification in the operation of the vehicle such that a subsequent change in the characteristic that corresponds to the modification reduces and/or remedies the breach of the comfort threshold level.

As used herein, any association (or relation, or reflection, or indication, or correspondency) involving servers, processors, client computing platforms, vehicles, sensors, output signals, forces, accelerations, threshold levels, comfort levels, characteristics, preferences, magnitudes, frequencies, vehicle states, vehicle envelopes, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying figures, all of which form a part of this specification, wherein like reference numerals designate corresponding parts in the various figures. It is to be expressly understood, however, that the figures are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

During vehicle operation, people may experience varying levels of comfort, also referred to as ride comfort. Ride comfort may vary over time. Ride comfort may depend on the individual user within the vehicle, the location or position within the vehicle, and/or other factors. Some events may (temporarily) reduce the ride comfort, such as crossing a speedbump. Ride comfort may be measured, estimated, predicted, and/or otherwise determined, and this information may be used to improve the ride comfort for the users within the vehicle. An example of an undesirable level of ride comfort may be a passenger experiencing motion sickness.

Figure 1:
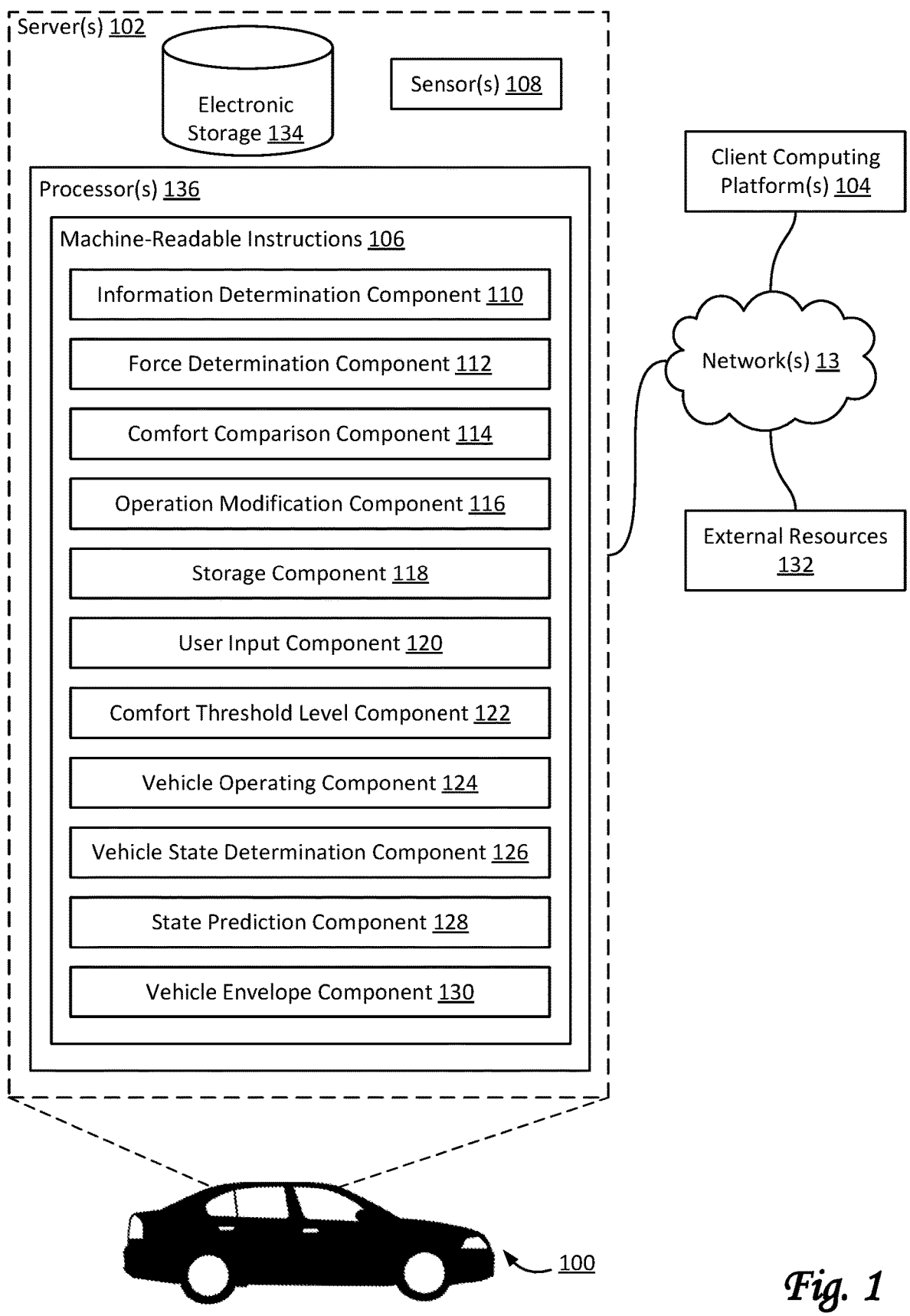
FIG. 1 shows a system configured to improve ride comfort for users within a vehicle during operation of the vehicle, in accordance with one or more implementations.

FIG. 1 illustrates a vehicle 100 configured to improve ride comfort for users within a vehicle during operation of the vehicle, in accordance with one or more implementations. The users within vehicle 100 may include a (human) vehicle operator, one or more passengers, and/or other users. In some implementations, ride comfort of one or more users may depend on multiple forces that are being experienced, surroundings of the one or more users, and/or other factors. For example, the multiple forces may include one or more of a lateral acceleration, a longitudinal acceleration, a vertical acceleration, derivatives thereof, and/or other forces. One or more forces and/or other factors may be combined to create a characteristic that represents and/or reflects a level of comfort. Comparisons and/or other types of analysis of such a characteristic with a particular pattern and/or threshold may indicate whether a particular level of comfort is acceptable or not, desirable or not, and/or otherwise distinguish between different levels of comfort. Based on such comparisons and/or other types of analysis, vehicle 100 may be configured to effectuate a modification in the operation of vehicle 100, and/or otherwise effectuate control of vehicle 100 in a particular way, such that ride comfort for one or more users is increased and/or otherwise improved. Improvements of ride comfort may be used for fully manual operation of a vehicle, fully autonomous operation of a vehicle, and any combination of human and autonomous operator.

In some implementations, vehicle 100 may include one or more servers 102, one or more processors 136, one or more sensors 108, electronic storage 134, and/or other components. Vehicle 100 may be configured to communicate with one or more other vehicles and/or client computing platforms 104 according to a client/server architecture, a peer-to-peer architecture, and/or other architectures. In some implementations, users may access vehicle 100 via client computing platform(s) 104.

Sensors 108 may be configured to generate output signals conveying information. In some implementations, the information may be related to the operation of one or more vehicles. In some implementations, the information may include one or more of current operational information regarding vehicle 100, vehicle proximity information, internal passenger presence information, external passenger presence information, external control information, visual information, motion-related information, position-related information, biometric information, and/or other information. In some implementations, the current operational information may include one or more of speed of vehicle 100, different types of acceleration of vehicle 100, different rotations of vehicle 100, yaw, pitch, and roll of vehicle 100, percent slip, slip angles, sideslip velocities, frictional forces, information regarding the braking system of vehicle 100, information regarding the engine of vehicle 100, information regarding the steering system of vehicle 100, information regarding the electrical system of vehicle 100, information regarding mechanical systems of vehicle 100, and/or other operational information of vehicle 100. In some implementations, at least one of sensors 108 may be a vehicle system sensor included in an engine control module (ECM) system or an electronic control module (ECM) system of vehicle 100. Combinations and derivations of information (or of parameters reflecting the information) are envisioned within the scope of this disclosure. For example, in some implementations, the current operational information may include yaw rate and/or its derivative for a particular user within vehicle 100. For example, in some implementations, the current operational information may include roll rate, roll angle, and/or their derivatives for a particular user within vehicle 100.

In some implementations, vehicle proximity information may indicate whether one or more vehicles are within a particular proximity of vehicle 100. In some implementations, internal passenger presence information may indicate whether (and/or where) one or more users are present in vehicle 100. In some implementations, external passenger presence information may indicate whether any passengers are present in one or more vehicles within a particular proximity of vehicle 100. In some implementations, external control information may indicate whether one or more vehicles within a particular proximity of vehicle 100 are currently under autonomous control. Some or all sensors 108 may be carried by an individual vehicle, e.g., vehicle 100.

Information from sensors 108 may include, by way of non-limiting example, timing information, vehicle operator information, and/or other information. In some implementations, generated information may be associated with timing information (e.g., from a timer), vehicle operator information, and/or other information. In some implementations, timing information may associate and/or otherwise relate the generated output signals with one or more moments of generation by one or more particular sensors. For example, timing information may include time stamps that indicate moments of generation. For example, at a time labeled t1 the speed of a vehicle may be 50 mph, at a time labeled t2 the speed may be 55 mph, and so forth. A set of time stamps or moments in time may form a timeline. In some implementations, the vehicle operator information may associate and/or otherwise relate the generated output signals with individual vehicle operators at the moments of generation. For example, a particular sensor may generate a particular output signal conveying a particular operating parameter of an individual vehicle, such as speed and/or another operating parameter. The particular output signal may include and/or be associated with a timestamp (e.g., time=tx) that indicates when the particular output signal was generated. For example, a series of output signals may be associated with a corresponding series of timestamps. In some implementations, the particular output signal may be associated with a particular vehicle operator. For example, the particular output signal may be associated with the particular vehicle operator that was operating the individual vehicle at the time the particular output signal was generated. In some implementations, a set of resources may be configured to store generated information, timing information, operator information, and/or other information, e.g., in electronic storage.

The sensors of a particular vehicle may be referred to as a set of sensors. An individual sensor may be vehicle-specific. In some implementations, one or more components of vehicle 100 may measure, derive, estimate, approximate, and/or otherwise determine one or more parameters based on one or more output signals generated by sensors 108.

Sensors 108 may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), weight sensors, a thermometer, an accelerometer, a yaw-rate sensor, a gyroscope, an inertial measurement sensor, stability sensors, orientation sensors, slip sensors, torque sensors, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors, degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 100.

In some implementations, sensors 108 may include image sensors, cameras, and/or other sensors. As used herein, the terms "camera" and/or "image sensor" may include any device that captures images and/or visual information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 134, such that captured information may be stored, at least initially, in the integrated embedded storage of a particular vehicle, e.g., vehicle 100. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Server(s) 102 may be configured by machine-readable instructions 106. Machine-readable instructions 106 may include one or more instruction components. The instruction components may include computer program components. The instruction components may include one or more of an information determination component 110, a force determination component 112, a comfort comparison component 114, an operation modification component 116, a storage component 118, a user input component 120, a comfort threshold level component 122, a vehicle operating component 124, a vehicle state determination component 126, a state prediction component 128, a vehicle envelope component 130, and/or other instruction components.

Information determination component 110 may be configured to determine current operational information regarding the vehicle. The determination may be based on output signals generated by one or more sensors 108. The current operational information may include speed, acceleration, yaw, pitch, roll, and/or other types of information regarding vehicle 100. Combinations and derivations of information (or of parameters reflecting the information) are envisioned within the scope of this disclosure.

Force determination component 112 may be configured to determine a sets of forces operating on one or more of the vehicle and one or more of the users within the vehicle. The sets of forces may include a current set of forces. For example, multiple different types of acceleration may operate on vehicle 100. In some implementations, vehicle 100 may be modeled as having a particular center of mass, and an individual force may be considered to operate on the center of mass of vehicle 100. In some implementations, an individual user within vehicle 100 may be modeled as having a particular center of mass, and an individual force may be considered to operate on the center of mass of the individual user. In some implementations, different acceleration forces of a user's body, stomach, head, and/or other part of the body may be determined independently. For example, a particular user may experience different lateral accelerations at his center of mass, his chest, his head, and so forth. Additionally, the particular user may experience different longitudinal and/or vertical accelerations at his center of mass, his chest, his head, and so forth. Additionally, different users within vehicle 100 may experience different accelerations based on their different positions within vehicle 100, their different physical characteristics (including but not limited to body weight), and/or other factors. In some implementations, derivatives of acceleration (also referred to as jerk) may be determined. In some implementations, derivatives of jerk (also referred to as jounce or snap) may be determined. In some implementations, an individual force in the current set of forces may be based on one or more of a lateral acceleration and/or a yaw rate. Alternatively, and/or simultaneously, in some implementations, an individual force in the current set of forces may be based on one or more of roll rate and/or roll angle.

In some implementations, force determination component 112 may be configured to determine individual sets of forces operating on a measured and/or predicted state of vehicle 100. For example, an individual one of the sets of forces may correspond to an individual future vehicle state. By way of non-limiting example, an individual set of forces may include a first acceleration of an individual user within the vehicle, a second acceleration of the individual user, a first jerk of the individual user within the vehicle, and a second jerk of the individual within the vehicle. In some implementations, the first acceleration may be a lateral acceleration, the second acceleration may be a longitudinal acceleration. In some implementations, the first jerk may be derived from the first acceleration and the second jerk may be derived from the second acceleration. In some implementations, individual sets of forces may correspond to individual future vehicle states in a set of predicted vehicle states.

Comfort comparison component 114 may be configured to compare one or more characteristics of a set of forces to one or more comfort threshold levels. In some implementations, a first characteristic of a set of forces may be based on a magnitude pertaining to the set of forces. In some implementations, a second characteristic of a set of forces may be based on a frequency pertaining to the set of forces. In some implementations, the comfort threshold levels may include a first comfort threshold level for a lateral acceleration, a second comfort threshold level for a longitudinal acceleration, a third comfort threshold level for a vertical acceleration, and so forth. In some implementations, the comfort threshold levels may include a fourth comfort threshold level for a derivative of lateral acceleration, a fifth comfort threshold level for a derivative of longitudinal acceleration, a sixth comfort threshold level for a derivative of vertical acceleration, and so forth. In some implementations, one or more comfort threshold levels may be passenger-specific. In some implementations, one or more comfort threshold levels may be specific to the model of vehicle 100. In some implementations, one or more comfort threshold levels may vary by time of day.

In some implementations, a breach of a comfort threshold level may indicate an undesirable level of comfort, e.g., for one or more of the users within vehicle 100. For example, a frequency (or rate of change) of a lateral acceleration may be deemed acceptable in a first set of frequency ranges, but undesirable in a second set of frequency ranges. For example, a frequency below 2 Hz, 1 Hz, 0.5 Hz, 0.1 Hz, and/or another frequency may be deemed acceptable. For example, a frequency between 2 Hz and 5 Hz may be deemed undesirable. In some implementations, a frequency range may vary with the magnitude of the acceleration. For example, at a greater magnitude a frequency between 1 Hz and 8 Hz may be deemed undesirable. In some implementations, frequency ranges for lateral and longitudinal acceleration may be coupled, such that the occurrence of longitudinal acceleration causes a greater frequency range for lateral acceleration to be undesirable. In some implementations, frequency ranges for lateral and vertical acceleration may be coupled, such that the occurrence of vertical acceleration causes a greater frequency range for lateral acceleration to be undesirable.

Operation modification component 116 may be configured to, responsive to the characteristic breaching one or more comfort threshold levels, effectuate one or more modifications in the operation of the vehicle. For example, operation of the vehicle may be modified by controlling one or more actuators of the vehicle, including but not limited to actuators included in the steering system, the braking system, stability control, shocks, and so forth. In some implementations, the one or more modifications may cause a subsequent change in one or more characteristics (of a set of forces) that corresponds to the one or more modifications. In some implementations, the subsequent change may reduce and/or remedy the breach of one or more comfort threshold levels. In some implementations, the subsequent change may improve the comfort level experienced by one or more users within vehicle 100. In some implementations, operation modification component 116 may be configured to effectuate modifications by modifying operations of vehicle operating component 124.

Storage component 118 may be configured to store user-specific preferences regarding ride comfort. One or more comfort threshold levels may be modified prior to comparisons with the one or more characteristics of a set of forces (e.g., the current set of forces). The modification may be based on the user-specific preferences.

User input component 120 may be configured to facilitate user input from an individual user within the vehicle. In some implementations, user input may represent a desired modification of one or more comfort threshold levels. In some implementations, user input may represent user feedback regarding current and/or past ride comfort. For example, user feedback may be used to modify one or more comfort threshold levels.

Comfort threshold level component 122 may be configured to modify one or more comfort threshold levels. In some implementations, modification by comfort threshold level component 122 may be in accordance with the user input. In some implementations, modification by comfort threshold level component 122 may occur in response to current operational information regarding the vehicle. For example, a particular operational parameter may breach a particular threshold level and thereby trigger a modification by comfort threshold level component 122.

Vehicle operating component 124 may be configured to operate vehicle 100. For example, operation of the vehicle may control of one or more actuators of the vehicle, including but not limited to actuators included in the steering system, the braking system, stability control, shocks, and so forth. In some implementations, vehicle operating component 124 may operate vehicle 100 in accordance with one or more modified comfort threshold levels. For example, vehicle operating component 124 may be configured to limit the speed of vehicle 100 to a maximum speed, and the maximum speed may be lowered due to a modified comfort threshold level. For example, vehicle operating component 124 may be configured to limit the lateral acceleration of vehicle 100 to a maximum lateral acceleration, and the maximum lateral acceleration may be reduced due to a modified comfort threshold level.

In some implementations, vehicle operating component 124 may be configured to operate vehicle 100 such that vehicle 100 maintains within a vehicle envelope.

Figure 3:
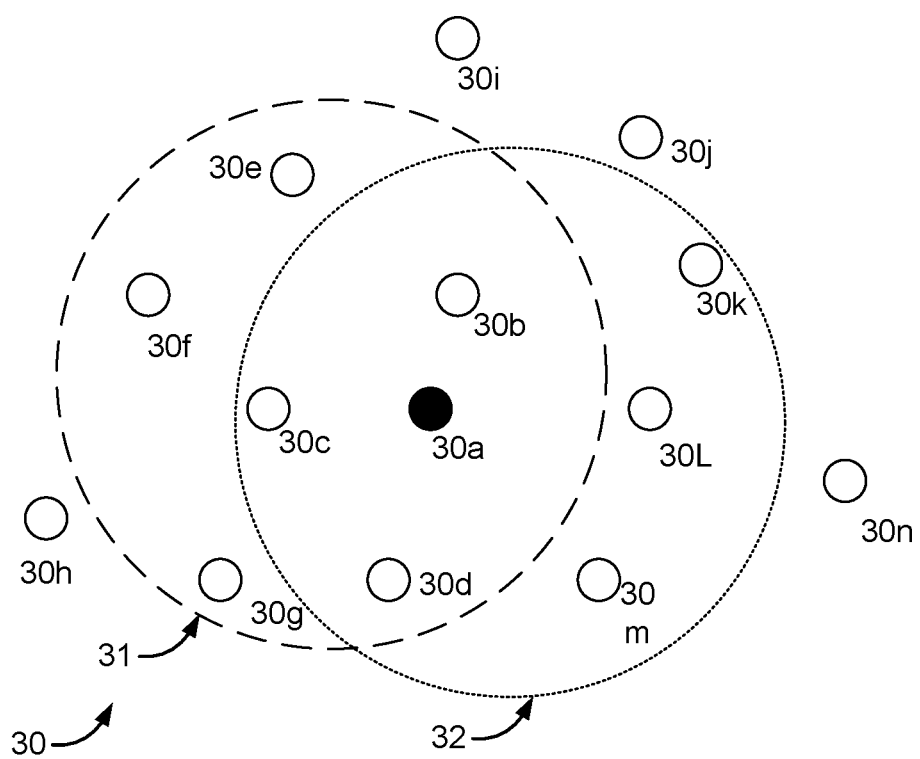
FIG. 3 illustrates a set of vehicle states, in accordance with one or more implementations.

Vehicle state determination component 126 may be configured to determine vehicle states of vehicle 100. In some implementations, vehicle state determination component 126 may be configured to determine a current vehicle state of the vehicle based on one or more of the current operational information, the current set of forces, and/or other information. A state of vehicle 100 may include a set of values for a set of parameters, including but not limited to operational parameters. By way of non-limiting example, FIG. 3 illustrates a set 30 of vehicle states, including vehicle states 30a-30n. Vehicle state 30a may represent the current vehicle state of vehicle 100, based on one or more of the current operational information, the current set of forces, and/or other information.

Referring to FIG. 1, state prediction component 128 may be configured to predict a set of future vehicle states vehicle 100 can reach from the current vehicle state. In some implementations, prediction may be within a maximum prediction period. The maximum prediction period may be 1 second, 2 seconds, 3 seconds, 4 seconds, 5 seconds, 10 seconds, and/or another period. Based on the current state of vehicle 100, a first predicted set of future vehicle states may include a first number of vehicle states vehicle 100 can reach in the next second. Based on the current state of vehicle 100, a second predicted set of future vehicle states may include a second number of vehicle states vehicle 100 can reach in the next two seconds. Based on the current state of vehicle 100, a third predicted set of future vehicle states may include a third number of vehicle states vehicle 100 can reach in the next three seconds, and so forth. The second number of vehicle states may be greater than the first number of vehicle states. The third number of vehicle states may be greater than the second number of vehicle states, and so forth. By way of non-limiting example, FIG. 3 illustrates set 30 of vehicle states, including vehicle states 30a-30n. Vehicle states 30b-30n may represent a set of future vehicle states vehicle 100 can reach from current vehicle state 30a. The set of vehicle states 30b-30n may be referred to as a predicted set of future vehicle states.

Referring to FIG. 1, vehicle envelope component 130 may be configured to determine one or more vehicle envelopes of vehicle 100. A vehicle envelope may represent a subset of a predicted set of future vehicle states. In some implementations, a first vehicle envelope may be determined such that operation of vehicle 100 within the subset of the first vehicle envelope is predicted to be desirable on account of the ride comfort for the users within vehicle 100. Alternatively, and/or simultaneously, the first vehicle envelope may be determined such that operation of vehicle 100 outside of the subset is predicted to be undesirable on account of the ride comfort for the users within vehicle 100. In some implementations, a second vehicle envelope may be determined such that operation of vehicle 100 within the subset of the second vehicle envelope is predicted to be desirable on account of stable operation of vehicle 100. Alternatively, and/or simultaneously, the second vehicle envelope may be determined such that operation of vehicle 100 outside of the subset is predicted to be undesirable on account of stable operation of vehicle 100. In some implementations, different vehicle envelopes may be used for different purposes and/or goals. By way of non-limiting example, FIG. 3 illustrates set 30 of vehicle states, including a predicted set of future vehicle states 30b-30n. Subset 31 of the predicted set of future vehicle states may represent a first vehicle envelope. Subset 32 of the predicted set of future vehicle states may represent a second vehicle envelope. For example, vehicle states 30b-30g fall within subset 31 and may represent (future) operation of a vehicle that is desirable on account of the ride comfort for the users within the vehicle. For example, vehicle states 30b-30d, 30k, 30L, and 30m fall within subset 32 and may represent (future) operation of a vehicle that is desirable on account of stable operation of the vehicle. For example, vehicle states 30h, 30i, 30j, and 30n fall outside of subset 31 and subset 32. For example, vehicle states 30b, 30c, and 30d fall within both subset 31 and subset 32. Operation of the vehicle currently in state 30a may be controlled such that the state of the vehicle maintains within one or both of subset 31 and subset 32.

Referring to FIG. 1, in some implementations, determinations of vehicle envelopes may be based on sets of forces, e.g., as determined by force determination component 112. The determination of a vehicle envelope may include comparisons of the individual sets of forces with one or more threshold levels (including but not limited to comfort threshold levels). The determination of a vehicle envelope may include determinations of ride comfort levels for the users within the vehicle.

In some implementations, determinations of vehicle envelopes may include comparisons of one or more ride comfort levels with one or more comfort threshold levels. In some implementations, individual ride comfort levels may correspond to individual sets of forces.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with vehicle 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of vehicle 100, external entities participating with vehicle 100, and/or other resources. In some implementations, some or all of the functionality attributed herein to external resources 132 may be provided by resources included in vehicle 100.

Server(s) 102 may include electronic storage 134, one or more processors 136, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 110, 112, 114, 116, 118, 120, 122, 124, 126, 128, and/or 130, and/or other components. Processor(s) 136 may be configured to execute components 110, 112, 114, 116, 118, 120, 122, 124, 126, 128, and/or 130, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, 124, 126, 128, and/or 130 are illustrated in FIG. 1 as being implemented within a single processing unit, in implementations in which processor(s) 136 includes multiple processing units, one or more of components 110, 112, 114, 116, 118, 120, 122, 124, 126, 128, and/or 130 may be implemented remotely from the other components. The description of the functionality provided by the different components 110, 112, 114, 116, 118, 120, 122, 124, 126, 128, and/or 130 described below is for illustrative purposes, and is not intended to be limiting, as any of components 110, 112, 114, 116, 118, 120, 122, 124, 126, 128, and/or 130 may provide more or less functionality than is described. For example, one or more of components 110, 112, 114, 116, 118, 120, 122, 124, 126, 128, and/or 130 may be eliminated, and some or all of its functionality may be provided by other ones of components 110, 112, 114, 116, 118, 120, 122, 124, 126, 128, and/or 130. As another example, processor(s) 136 may be configured to execute one or more additional components that may perform some or all of the functionality attributed below to one of components 110, 112, 114, 116, 118, 120, 122, 124, 126, 128, and/or 130.

Figure 2:
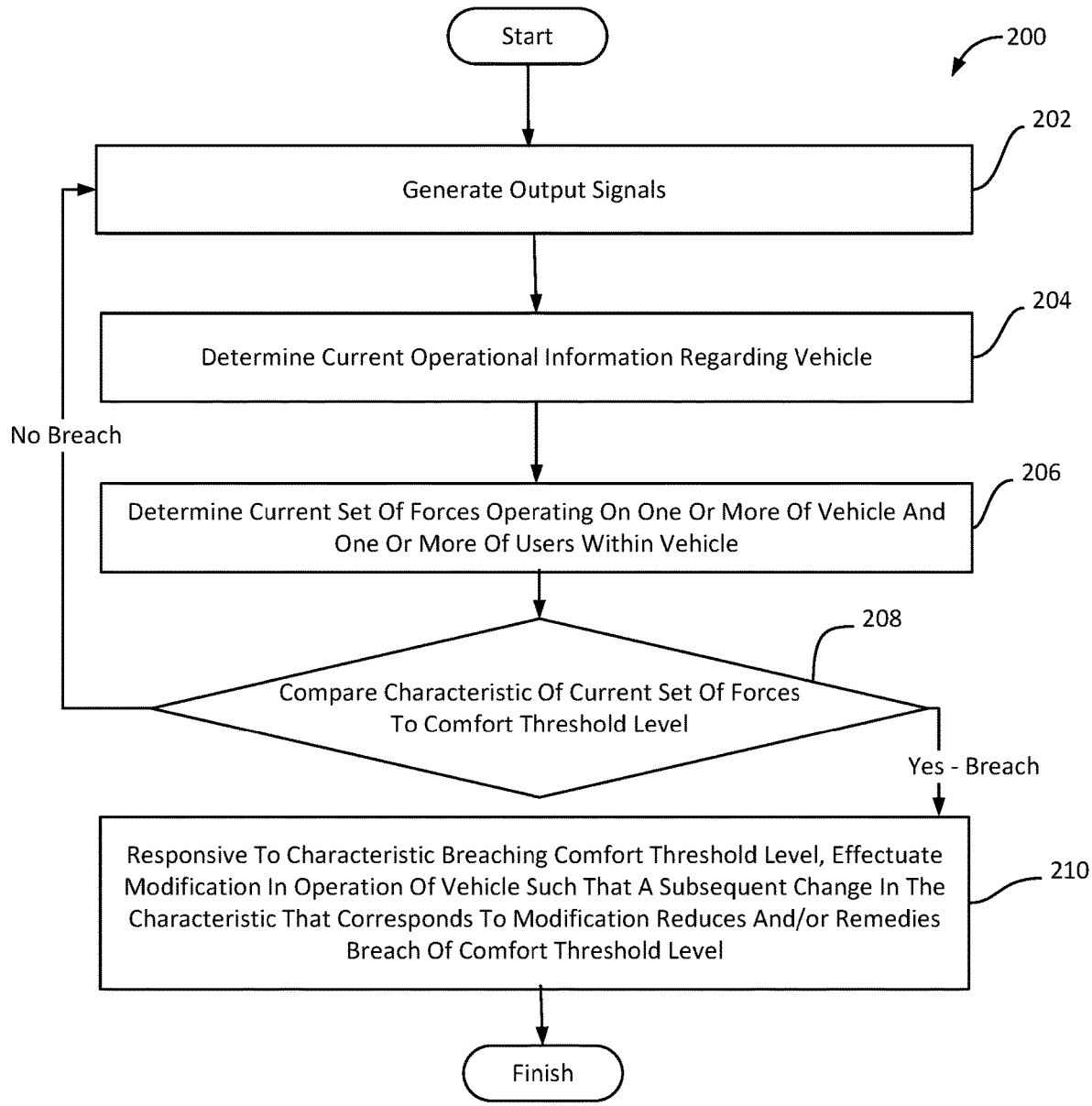
FIG. 2 includes a flow chart of a method to improve ride comfort for users within a vehicle during operation of the vehicle, in accordance with one or more implementations.

FIG. 2 illustrates a method 200 to improve ride comfort for users within a vehicle during operation of the vehicle, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals. The output may signal convey current operational information regarding the vehicle. Operation 202 may be performed by one or more sensors that are the same as or similar to sensors 108, in accordance with one or more implementations.

An operation 204 may include determining the current operational information regarding the vehicle. The determination may be based on the output signals. The current operational information may include speed of the vehicle. Operation 204 may be performed by one or more hardware processors configured by machine-readable instructions including a component that is the same as or similar to information determination component 110, in accordance with one or more implementations.

An operation 206 may include determining a current set of forces operating on one or more of the vehicle and one or more of the users within the vehicle. An individual force in the current set of forces may be based on one or more of a lateral acceleration and/or a yaw rate. Operation 206 may be performed by one or more hardware processors configured by machine-readable instructions including a component that is the same as or similar to force determination component 112, in accordance with one or more implementations.

An operation 208 may include comparing a characteristic of the current set of forces to a comfort threshold level. A breach of the comfort threshold level may indicate an undesirable level of comfort for one or more of the users within the vehicle. When operation 208 results in an indication of a breach of the comfort threshold level, a breach may be present and the process may proceed to operation 210. When operation 208 results in no indication of a breach of the comfort threshold level, a breach may not be indicated and the process may proceed back to operation 202. Operation 208 may be performed by one or more hardware processors configured by machine-readable instructions including a component that is the same as or similar to comfort comparison component 114, in accordance with one or more implementations.

An operation 210 may include responsive to the characteristic breaching the comfort threshold level, effectuating a modification in the operation of the vehicle such that a subsequent change in the characteristic that corresponds to the modification reduces and/or remedies the breach of the comfort threshold level. Operation 210 may be performed by one or more hardware processors configured by machine-readable instructions including a component that is the same as or similar to operation modification component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for improving ride comfort for users within a vehicle during operation of the vehicle, the method comprising:
    determining sets of forces operating on one or more of the vehicle and one or more of the users within the vehicle, wherein individual sets of forces correspond to potential future vehicle states;
    determining a subset of the potential future vehicle states such that operation of the vehicle within the subset is predicted to be desirable on account of the ride comfort for the one or more of the users within the vehicle,
    wherein the operation of the vehicle outside of the subset is predicted to be undesirable on account of the ride comfort for the one or more of the users within the vehicle, and
    wherein determination of the subset of the potential future vehicle states is based on the individual sets of forces; and
    continuing the operation of the vehicle such that the vehicle maintains the operation of the vehicle within the subset of the potential future vehicle states;
    determining the current operational information regarding the vehicle, wherein the determination is based on the output signals;
    determining a current set of forces operating on one or more of the vehicle and one or more of the users within the vehicle;
    determining a current vehicle state of the vehicle based on the current operational information and the current set of forces; and
    comparing a characteristic of the current set of forces to a comfort threshold level, wherein a breach of the comfort threshold level indicates an undesirable level of comfort for one or more of the users within the vehicle.

2. The method of claim 1, further comprising:
    storing user-specific preferences regarding the ride comfort, wherein the comfort threshold level is modified prior to comparisons with the characteristic of the current set of forces, the modification being based on the user-specific preferences.

3. A vehicle configured to improve ride comfort for users within the vehicle during operation of the vehicle, the vehicle comprising:
    a set of sensors configured to generate output signals, wherein the output signals convey current operational information regarding the vehicle; and
    one or more hardware processors configured by machine-readable instructions to:
        determine sets of forces operating on one or more of the vehicle and one or more of the users within the vehicle, wherein individual sets of forces correspond to potential future vehicle states;
        determine a subset of the potential future vehicle states such that operation of the vehicle within the subset is predicted to be desirable on account of the ride comfort for the one or more of the users within the vehicle,
        wherein the operation of the vehicle outside of the subset is predicted to be undesirable on account of the ride comfort for the one or more of the users within the vehicle, and
        wherein determination of the subset of the potential future vehicle states is based on the individual sets of forces; and
        continue the operation of the vehicle such that the vehicle maintains the operation of the vehicle within the subset of the potential future vehicle states,
        wherein the determination of the subset of the potential future vehicle states of the vehicle includes comparisons of the individual sets of forces with threshold levels.

4. The vehicle of claim 3, wherein the potential future vehicle states are based on stable operation of the vehicle from a current state to the potential future vehicle states.

5. The vehicle of claim 3, wherein the subset of the potential future vehicle states are limited based on the individual sets of forces exceeding one or more comfort threshold levels.

6. A vehicle configured to improve ride comfort for users within the vehicle during operation of the vehicle, the vehicle comprising:
    a set of sensors configured to generate output signals, wherein the output signals convey current operational information regarding the vehicle; and
    one or more hardware processors configured by machine-readable instructions to:
        determine sets of forces operating on one or more of the vehicle and one or more of the users within the vehicle, wherein individual sets of forces correspond to potential future vehicle states;
        determine a subset of the potential future vehicle states such that operation of the vehicle within the subset is predicted to be desirable on account of the ride comfort for the one or more of the users within the vehicle,
        wherein the operation of the vehicle outside of the subset is predicted to be undesirable on account of the ride comfort for the one or more of the users within the vehicle, and
        wherein determination of the subset of the potential future vehicle states is based on the individual sets of forces;
        continue the operation of the vehicle such that the vehicle maintains the operation of the vehicle within the subset of the potential future vehicle states;
        determine the current operational information regarding the vehicle, wherein the determination is based on the output signals;
        determine a current set of forces operating on one or more of the vehicle and one or more of the users within the vehicle;
        determine a current vehicle state of the vehicle based on the current operational information and the current set of forces; and
        compare a characteristic of the current set of forces to a comfort threshold level, wherein a breach of the comfort threshold level indicates an undesirable level of comfort for one or more of the users within the vehicle.

7. The vehicle of claim 6, the one or more hardware processors configured by machine-readable instructions further to:
    store user-specific preferences regarding the ride comfort, wherein the comfort threshold level is modified prior to comparisons with the characteristic of the current set of forces, the modification being based on the user-specific preferences.

8. The vehicle of claim 6, wherein the characteristic of the current set of forces is based on one or more of a magnitude pertaining to the current set of forces and/or a frequency pertaining to the current set of forces.

9. The vehicle of claim 6, wherein the comfort threshold level is passenger-specific.

10. The vehicle of claim 6, the one or more hardware processors configured by machine-readable instructions further to:
    facilitate user input from an individual user within the vehicle, wherein the user input represents a desired modification of the comfort threshold level;
    modify the comfort threshold level in accordance with the user input; and
    operate the vehicle in accordance with the modified comfort threshold level.

11. The method of claim 1, wherein the comfort threshold level is passenger-specific.

12. The method of claim 1, wherein the characteristic of the current set of forces is based on one or more of a magnitude pertaining to the current set of forces and/or a frequency pertaining to the current set of forces.

13. A method for improving ride comfort for users within a vehicle during operation of the vehicle, the method comprising:
    determining sets of forces operating on one or more of the vehicle and one or more of the users within the vehicle, wherein individual sets of forces correspond to potential future vehicle states;
    determining a subset of the potential future vehicle states such that operation of the vehicle within the subset is predicted to be desirable on account of the ride comfort for the one or more of the users within the vehicle,
    wherein the operation of the vehicle outside of the subset is predicted to be undesirable on account of the ride comfort for the one or more of the users within the vehicle, and
    wherein determination of the subset of the potential future vehicle states is based on the individual sets of forces; and
    continuing the operation of the vehicle such that the vehicle maintains the operation of the vehicle within the subset of the potential future vehicle states,
    wherein the determination of the subset of the potential future vehicle states of the vehicle includes comparisons of the individual sets of forces with threshold levels.

14. The method of claim 13, wherein the potential future vehicle states are based on stable operation of the vehicle from a current state to the potential future vehicle states.

15. The method of claim 13, wherein the subset of the potential future vehicle states are limited based on the individual sets of forces exceeding one or more comfort threshold levels.

16. The method of claim 1, further comprising:
    facilitating user input from an individual user within the vehicle, wherein the user input represents a desired modification of the comfort threshold level;
    modifying the comfort threshold level in accordance with the user input; and
    operating the vehicle in accordance with the modified comfort threshold level.

\* \* \* \* \*